United States Patent [19]

Shotts et al.

[11] Patent Number: 5,000,369
[45] Date of Patent: Mar. 19, 1991

[54] METHOD AND APPARATUS FOR MANUFACTURING PLASTIC-LINED PIPE

[75] Inventors: David A. Shotts, Naperville; Raffaele Basile, Chicago Heights, both of Ill.

[73] Assignee: Allied Tube & Conduit Corporation, Harvey, Ill.

[21] Appl. No.: 275,010

[22] Filed: Nov. 22, 1988

[51] Int. Cl.$^5$ ................... B23K 11/00; B23K 101/06
[52] U.S. Cl. ................................. 228/147; 228/151; 228/156; 228/176; 156/187; 156/218; 156/275.1
[58] Field of Search ............ 228/126, 128, 129, 130, 228/156, 175, 147, 150, 151, 176, 190; 219/61.2, 61.7; 156/187, 218, 275.1

[56] References Cited

U.S. PATENT DOCUMENTS

| | | | |
|---|---|---|---|
| 2,803,730 | 8/1957 | Kinghorn | 156/275.1 |
| 3,069,763 | 12/1962 | Reynolds | 29/429 |
| 3,315,348 | 4/1967 | Donovan et al. | 29/475 |
| 3,332,138 | 7/1967 | Garner | 29/430 |
| 3,562,899 | 2/1971 | Stout et al. | 228/130 |
| 3,720,994 | 3/1973 | Wagele | 228/147 |
| 3,807,031 | 4/1974 | Jachimowicz et al. | 228/130 |
| 4,341,578 | 7/1982 | Chermak et al. | 156/275.1 |
| 4,781,780 | 11/1988 | Hannover | 156/287 |

FOREIGN PATENT DOCUMENTS

| | | |
|---|---|---|
| 226410 | 6/1987 | European Pat. Off. |
| 15791 | 5/1973 | Japan ................... 228/147 |
| 1233574 | 5/1971 | United Kingdom ............. 228/190 |
| 2038444 | 7/1980 | United Kingdom. |

Primary Examiner—Sam Heinrich
Attorney, Agent, or Firm—Fitch, Even, Tabin & Flannery

[57] ABSTRACT

Method for continuously manufacturing plastic-lined metallic pipe. The method includes an extruder having an output providing a plastic sleeve and further includes a continuous roll-forming tubing mill production line. This production line includes a series of forming rolls which progressively deform a substantially flat steel strip to a generally tubular configuration as the strip moves along a straight-line longitudinal path. The production line further includes an electrical resistance or high frequency welder which continuously welds the lateral edges of the moving strip to complete the pipe. The method also includes a feed for the plastic sleeve into the incipient metal pipe upstream of the welder. The plastic sleeve has an outside diameter slightly smaller than the inside diameter of the metallic pipe in its as-formed condition. Furthermore, the plastic sleeve maintains a generally tubular configuration from the time it enters the pipe until the manufacture of the plastic-lined pipe is completed. The exterior surface of the metal pipe can be galvanized in the production line, or raw steel pipe can be lined and the exterior surface later painted. The production line also includes a sizing station for reducing the inside diameter of the metallic pipe to substantially the outside diameter of the plastic sleeve.

16 Claims, 2 Drawing Sheets

METHOD AND APPARATUS FOR MANUFACTURING PLASTIC-LINED PIPE

This invention relates to the manufacture of metallic pipe and, more specifically, to the continuous manufacture of plastic-lined steel pipe.

BACKGROUND OF THE INVENTION

Plastic-lined pipe offers advantages over standard metallic pipe in certain applications. For example, a pipe lined with an inert plastic can be used to carry a liquid which is corrosive to the outer metal pipe. Plastic-lined pipe lengthens the life of a sprinkler system because of the rust free interior. Additionally, plastic-lined pipe can provide greater flow rate because frictional loss is reduced due to a higher Hazen-Williams pipe roughness coefficient or C-factor.

Various methods have been proposed for manufacturing plastic-lined metallic pipe. In one such method, a plastic sleeve of polyethylene is inserted into an outer aluminum tube that is being seam-welded to produce lined aluminum tubing which is wound into a coil. The plastic sleeve is folded under a shoe, extending downstream of the welder, which flattens it against the underside of the aluminum tubing, keeping it spaced apart from the heat of the seam-welding operation. Gas under high pressure is used to inflate the flattened sleeve to its full diameter and force it against the interior surface of the welded tubing. The welded tubing can be swaged to a smaller diameter following the inflation of the interior sleeve. This process is not continuous, as a coil of plastic sleeve of some finite length is employed, which allows air to be exhausted from the end of it. For additional information concerning the structure and operation of the apparatus employed in this process, reference may be made to U.S. Pat. No. 3,069,763.

In another prior art method of making plastic-lined metal pipe, a steel pipe of finite length is lined with a plastic sleeve by first stretching the sleeve longitudinally. After the stretched sleeve is inserted into the steel pipe, it is released to return, due to its resiliency, toward its as-formed diameter thereby engaging the inner surface of the pipe. For additional information on this method, reference may be made to European Patent Application No. 0226410.

SUMMARY OF THE INVENTION

Among the several aspects and features of the present invention may be noted the provision of an improved method and apparatus for manufacturing plastic-lined metal pipe. The pipe is manufactured using an extruder, for providing a plastic sleeve, in conjunction with a continuous roll-forming tubing mill production line, for forming and treating the metallic outer tube, so that the lined pipe is made using a continuous process. The plastic sleeve is caused to not collapse during the manufacturing process and the sleeve and pipe are firmly locked together. The apparatus of the present invention has long service life, is reliable in use and it economically and efficiently manufactures the plastic-lined pipe. Other aspects and features of the present invention will be in part, apparent and, in part, specifically set forth in the following specification and accompanying drawings.

Briefly, the present invention includes apparatus for continuously manufacturing plastic-lined metal pipe including an extruder for providing a plastic sleeve and a continuous roll-forming tubing mill production line. The production line operates to sequentially deform a substantially flat steel strip to a generally tubular configuration and includes an electric resistance welder or high frequency welder for continuously welding the lateral edges of the moving strip to complete the pipe. A plastic sleeve is fed into the about-to-be-formed metallic pipe upstream of the welder. This plastic sleeve has an outside diameter slightly smaller than the inside diameter of the metallic pipe in the as-formed condition of the sleeve and the sleeve maintains its generally tubular configuration from the time it is inserted into the metal pipe until the manufacture is completed. The production line also includes a station for reducing the inside diameter of the metallic pipe to substantially the outside diameter of the plastic sleeve thereby locking the two components together.

As a method, the invention includes the followings steps:

(a) The plastic sleeve, which is made using an extruder, is fed into the incipient metal pipe upstream of the location of welding.

(b) The plastic sleeve is maintained in its generally tubular configuration.

(c) The edges of the strip are welded together downstream of the sleeve entry, and (d) The metallic pipe is sized downstream of the location of welding to reduce the inside diameter of the metallic pipe to about the outside diameter of the plastic sleeve to form a mechanical lock therebetween.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
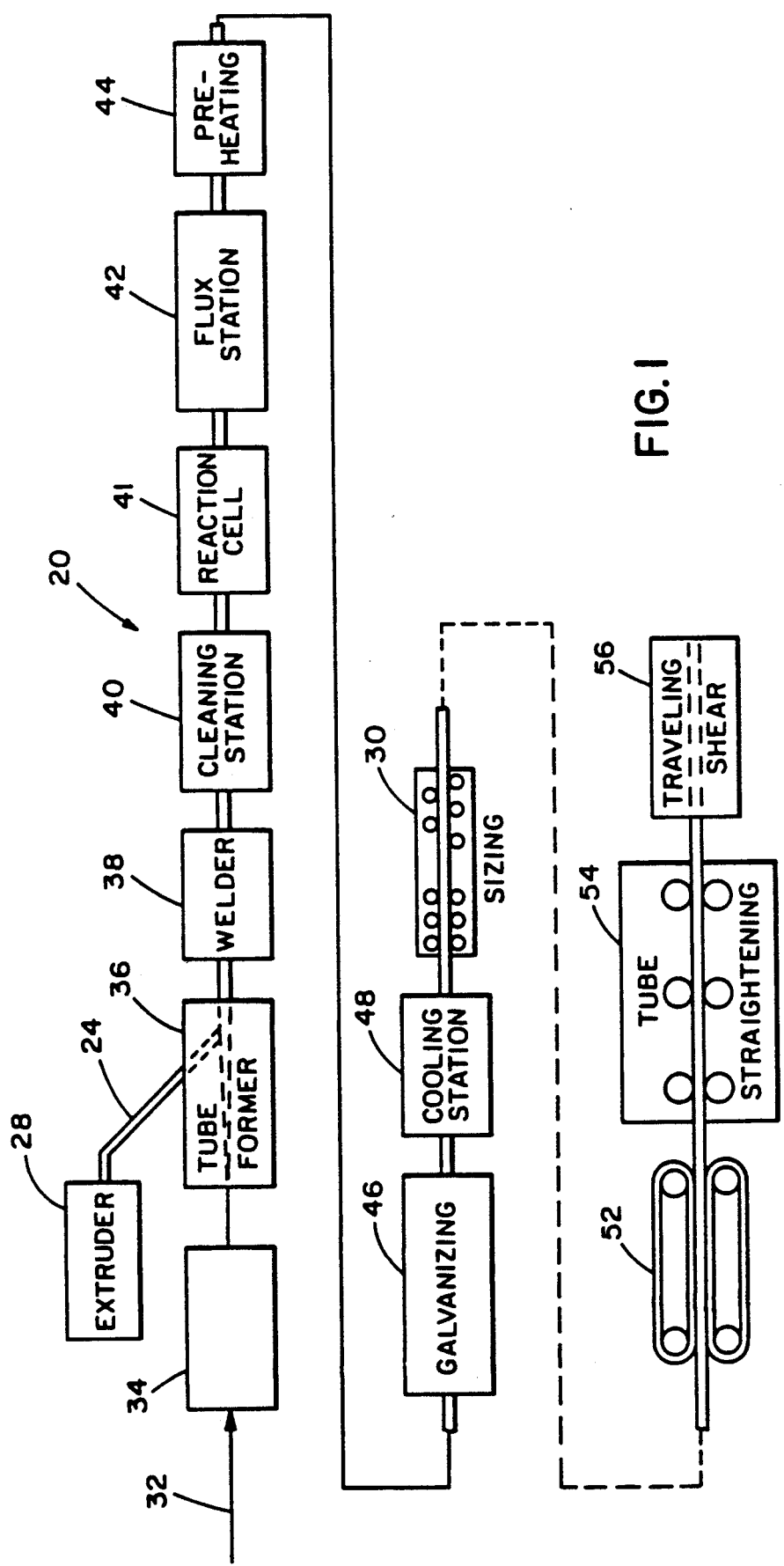
FIG. 1 is a diagrammatic illustration, in block form, of an in-line, continuous, roll-forming tube mill production line, used in conjunction with an extruder, for making plastic-lined metallic pipe embodying various aspects of the present invention.
Figures 4, 5:
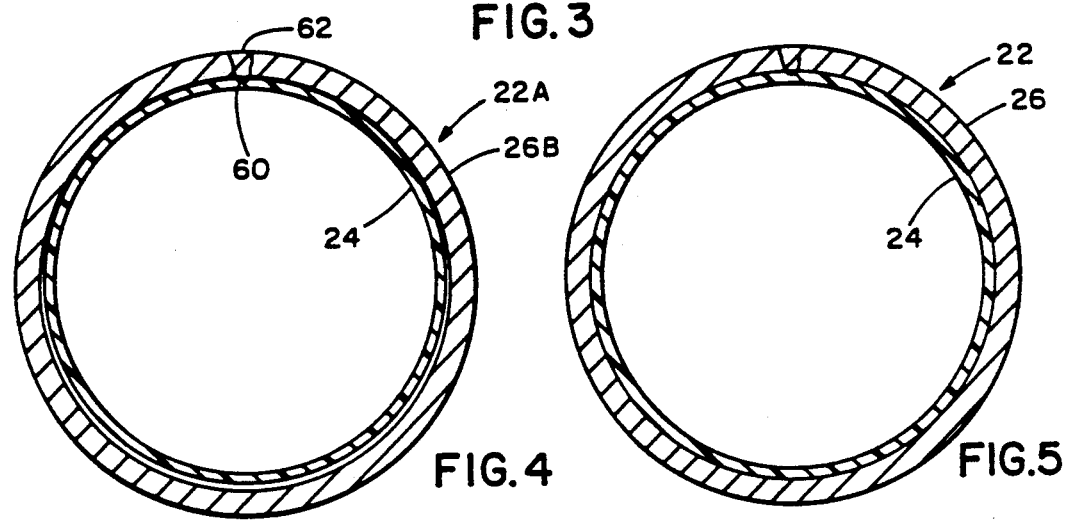
FIG. 4 is a cross-sectional view of the plastic-lined metallic pipe between the welding station and a sizing station.
FIG. 5 is a cross-sectional view of the plastic-lined metallic pipe after its exit from the sizing station.

Referring now to the drawings, apparatus for continuously manufacturing plastic-lined metallic pipe 22, shown in FIG. 5, is generally indicated by reference numeral 20 in FIG. 1. The pipe 22 includes an inner sleeve 24 of an extruded thermoplastic material and an outer pipe 26 which is preferably formed of steel. The outside diameter of the sleeve 24 is approximately equal to the inside diameter of the outer pipe 26 so that the two are mechanically locked together. Among the thermoplastic materials from which the sleeve can be made are polypropylene, polyethylene, PVC, nylon, Teflon (PTFE), Halar (ECTFE), Kynar (PVDF) or Noryl. The final four names are registered trademarks of DuPont, Austimont, Pennwalt, and General Electric, respectively. Furthermore, talc can be mixed with thermoplastics to form a compound having a higher heat-deflection temperature.

It is well known to produce endless lengths of welded steel pipe from strip stock and to continuously galvanize that pipe by providing a zinc coating on the exterior surface as taught, for example, in U.S. Pat. Nos. 3,122,114 and 3,230,615. It is likewise known to continuously apply polymeric coatings to the exterior of such continuously formed tubing, employing various thermoplastic and thermosetting resins, as for example taught in U.S. Pat. Nos. 3,559,280; 3,616,983; 3,667,095; 3,965,551; 4,621,399 and 4,771,523.

A preferred embodiment of the apparatus including an extruder 28 used in conjunction with an in-line, continuous, roll-forming tubing mill production line is illustrated in FIG. 1. Some details are omitted from the portion of the production line downstream of a sizing station 30 where various coatings may, if desired, be applied to the exterior of the pipe 22 provided their inclusion does not result in melting of the sleeve 24. A more detailed description of these various stations is found in the aforementioned patents.

Although the overall production line is illustrated as including a galvanizing station, in its broadest aspects, the invention is considered to be valuable whether or not the pipe 22 is galvanized. Although the term "galvanizing" is used, this term is employed in its broadest sense and is not intended to be restricted to the employment of pure zinc as, for example, an alloy of zinc with aluminum could be used. More specifically, the production line can be used to provide a plastic liner in a pipe formed of raw steel. If the steel is not galvanized, it may be desirable to paint the outside surface of the pipe. If the pipe is not required to be galvanized, stations 40-48 may be omitted.

The overall apparatus of FIG. 1 depicts a production line in which each of the stations is considered to be treating steel strip moving from left to right At the upper left-hand corner, strip 32 is shown which is being supplied from a suitable roll source (not shown). The strip travels past an end welder (not shown), known in the art for splicing an end of one roll to another roll at the required time, and enters an accumulator 34 wherein a sufficient length of strip is stored to supply the line while adjacent ends are being welded. Likewise, the edges of the strip may be appropriately treated so as to be ready for welding at the time that the strip 32 enters a tube former 36. The tube former 36 is constituted by a series of conventional forming rolls whereby the strip is continuously deformed from its initial flat character to that of a rounded tube with the edges of the strip in approximately abutting relation to form the seam of the tube upon welding.

The continuous tubular form created by the tube former 36 advances directly to a welder 38 where the edges of the strip are joined by welding. The welder is either ERW or high frequency, preferably of the type employing a water-cooled, rotatable electrode which contacts the top surfaces of the edges of the strip. ERW (electrical resistance welders) include contact rotary low frequency, contact high frequency, and induction high frequency. After the welding is complete and scarfing of the outer surface in the welded region is effected, the tubing is passed to a washing and pickling station 40 where cleaning and removal of oxides occur. This station may include an alkali wash for removing grease from the surface of the tubing, followed by rinsing and then acid treatment for pickling the surface, followed by a further rinse, all of which are well known in the prior art and described in the earlier-mentioned patents.

The output of the extruder 28, the sleeve 24, enters the partially formed outer pipe 26A about 2¼ to 3 feet upstream of the welder 38 where the rolls of the tube former 36 have yet to bring the strip edges closer together than the diameter of the sleeve 24. As will be discussed more fully hereinafter, the outside diameter of the sleeve is slightly less than the inside diameter of the outer pipe 26 after forming and welding.

Following the cleaning station 40, the pipe passes through a reaction cell 41 containing dilute hydrochloric acid to remove oxides from the outer surface of the steel outer pipe 26. After this pickling, the pipe 22 passes through a flux station 42 preferably including a flux reaction cell of the flooded chamber type where the pipe passes through a strong inorganic acid type flux for preparing the pipe for galvanization. An example of such a flux is Blackstone No. 3345 available from the Blackstone Corporation of Jamestown N.Y. The flux bath is preferably at ambient temperature. Thereafter the pipe moves to a preheating station 44 where the pipe is heated to a temperature less than the melting temperature of the sleeve. Induction heating is preferred although other types of heating can be employed to bring the pipe up to about 200°-240° F. prior to its entry into a galvanization station 46. In the galvanization station, the pipe passes through a bath of molten zinc, which has a temperature of about 870° F. which is higher than the melting temperature of the plastic sleeve 24. This results in the outside surface of the outer pipe picking up a uniform coating of zinc or zinc alloy as it passes through the bath. Appropriate wiping is effected at the exit from the zinc bath, and the galvanized tubing proceeds immediately to a cooling station 48, which may be a water-filled quench tank. After cooling to the desired temperature is effected, the galvanized pipe 22 next enters the sizing station 30 where the outer pipe 26 is sized so that its inside diameter is substantially equal to the outside diameter of the plastic sleeve 24 so that the two are mechanically locked.

After the sizing station 30, various stations could be employed for providing a decorative or protective coating to the outside surface of the pipe 22. For further information concerning such stations, see the aforementioned patents. Further downstream, the production line could further include a take-off assist device 52 (fully described in commonly-assigned U.S. Pat. No. 3,965,551). A tube straightening station 54 can also be employed if needed. Finally, a traveling shear 56 may be included to sever the plastic-lined pipe to desired lengths.

Figure 2:
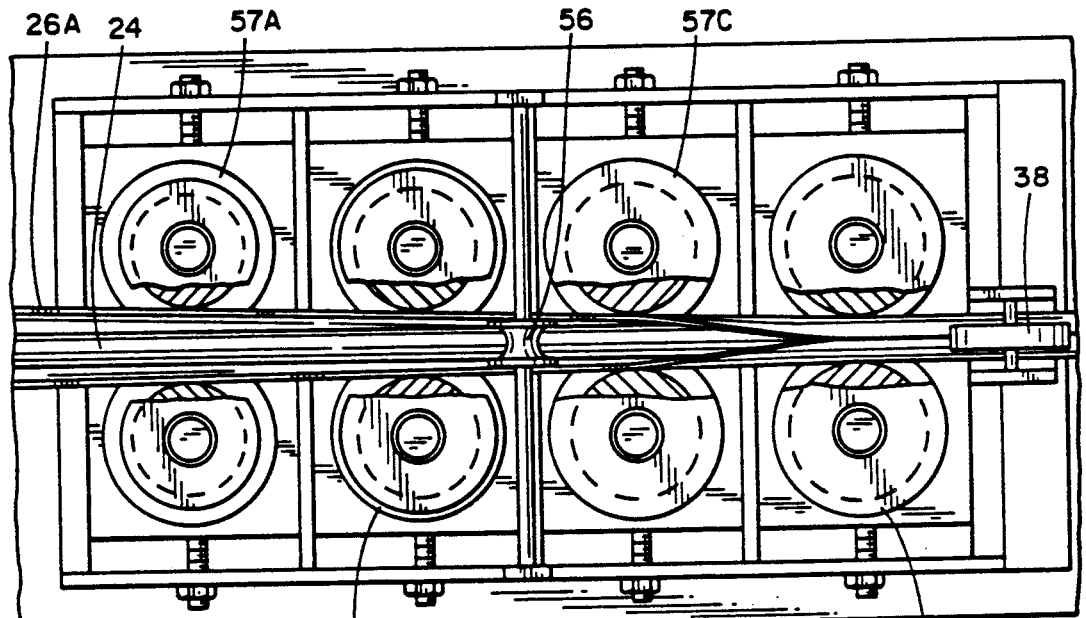
FIG. 2 is a simplified plan view showing a plastic sleeve being fed into the about-to-be-formed metal pipe upstream of a welding station.
Figure 3:
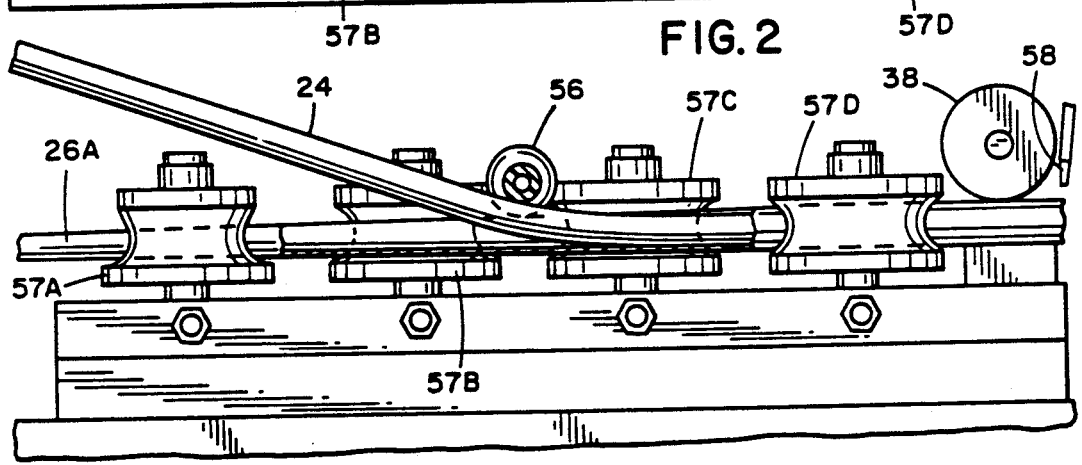
FIG. 3, similar to FIG. 2, is a side elevational view depicting the plastic sleeve being fed into the incipient metal pipe upstream of the welding station.

Referring to FIGS. 2 and 3, an idler roller 56 is preferably used between the first set of rollers 57A and the last set of rollers 57D in the portion of the tube forming station shown, to apply force pushing the sleeve 24 into the incipient outer pipe 26A. The welder used is either an ERW type or a high frequency type. With the electrical resistance welder 38, heating is localized in the area of the top of the outer pipe 26 where the lateral edges are joined. Although the temperature at the top outer surface of the pipe 26 at the welder is far above the melting temperature of the plastic, it does require some time for the inner top pipe surface to rise above the plastic melt temperature. Due to the vibrations attendant the production line, which may have a speed of 150–300 feet per minute, the sleeve 24 contacts the top inside pipe surface. Because this surface is well above the plastic melting temperature, the sleeve becomes tacky and adheres or melt bonds to the inside surface of the pipe before the pipe cools to below the plastic melt temperature. The welding station preferably includes a nozzle 58, located slightly downstream of the welder 38 for directing water at the top of the pipe to promote its rapid cooling below the plastic melt temperature. Throughout its extension in the outer pipe 26, the plastic sleeve retains its generally tubular configuration. Furthermore, the localized tacking of the sleeve to the pipe along the longitudinal welding seam serves to temporarily lock the two together so that they both advance at the same rate in the production mill. If the sleeve 24 slipped with respect to the pipe 26, the sleeve might linger near the welder or adjacent the galvanization station long enough to collapse.

It will be appreciated that when the pipe passes through the molten zinc at the galvanization station 46, it is only the outer surface of the pipe that is instantaneously heated to the high temperature. Due to the thermal inertia, that is, the inability of the pipe to instantaneous heat due to its mass, of the outer pipe 26 as well as the sleeve 24, the pipe is cooled at the cooling station 48 before the sleeve is heated sufficiently to collapse. The sleeve should have a wall thickness not less than about .030 inch to avoid melting.

The pipe 22A shown in FIG. 4 is between the welder 38 and the sizing station 30 where the sleeve 24 is tacked to the outer pipe 26B only at a location 60 along the welding seam 62. After sizing, as shown in FIG. 5, the inside diameter of the outer pipe 26 is substantially equal to the inside diameter of the sleeve 24 resulting in their mechanical locking.

As a method of continuously manufacturing a plastic-lined metallic pipe 22 using an extruder 28 in concert with a continuous roll mill production line, the present invention includes several steps:

(A) The plastic sleeve 24 is fed into the incipient metal outer pipe 26 upstream of the location of welding, with the plastic sleeve having an outside diameter slightly smaller than the inside diameter of the metal pipe.

(B) The plastic sleeve is maintained in its generally tubular configuration throughout its extension into the pipe.

(C) Adjacent lateral edges of the incipient pipe are continuously welded together downstream of where the plastic sleeve enters, and (D) The outer pipe 26 is sized downstream of the location of welding to reduce its inside diameter to substantially the outside diameter of the metal sleeve thereby mechanically locking them together forming the plastic-lined metallic pipe 22.

When the pipe 22 is to be galvanized, the method includes the further substeps to be performed prior to the step of sizing:

(a) The exterior surface of the moving pipe is cleaned and dried.

(b) The cleaned pipe is passed through a flux bath which is at a first temperature below the melting temperature of the sleeve 24.

(c) The pipe is heated to a second temperature which is above the first temperature and below the melting temperature of the plastic sleeve.

(d) The heated pipe is then passed through a molten zinc bath which has a temperature above the melting temperature in the sleeve, and (e) The galvanized pipe is quenched to prevent collapse of the plastic sleeve.

As a specific example, the plastic sleeve 24 could be formed of polypropylene which has a melting temperature of about 320° F. The polypropylene could have a wall thickness of about 3/64 of an inch. The outside diameter of the plastic sleeve could be about 1.450 inches with the inside diameter of the metal tube prior to sizing being about 1.460 to 1.470 inches. After sizing the inside diameter of the outer pipe 26 is substantially the same as the outside diameter of the plastic sleeve, about 1.450 inches, while the outside diameter of the pipe could be about 1.64 inches. In order to increase the heat-deflection temperature of the sleeve, the thermoplastic could contain at least 20 weight % talc.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method of continuously manufacturing plastic-lined metallic pipe using an extruder for making a tubular plastic sleeve having a predetermined outside diameter and a continuous roll mill production line which functions to progressively deform a metal strip from a generally flat configuration to a generally tubular configuration as the strip moves along a straight-line longitudinal path, and to continuously weld adjacent lateral edges of the moving strip to complete the pipe, said method comprising the following steps:

(A) feeding said tubular plastic sleeve into the incipient metal pipe upstream of the location of welding, said plastic sleeve having an outside diameter slightly smaller than the inside diameter of the metal pipe;

(B) maintaining said plastic sleeve in its generally tubular configuration and with substantially said predetermined outside diameter from the time said sleeve enters said incipient metal pipe until said method is completed;

(C) continuously welding together said adjacent lateral edges downstream of the location of entry of said sleeve into said incipient metal pipe; and (D) sizing said metallic pipe downstream of the location of welding to reduce the inside diameter of said metal pipe to substantially the outside diameter of said plastic sleeve to mechanically lock together said pipe and said sleeve thereby forming said plastic-lined metallic pipe.

2. A method as set forth in claim 1 wherein said plastic sleeve is fed into said incipient metal pipe between 1¼ and 4 feet upstream of the location of welding.

3. A method as set forth in claim 1 wherein the welding is effected using an electrical contact resistance welder.

4. A method as set forth in claim 1 wherein said step of maintaining includes preventing the temperature of said plastic sleeve from rising to a temperature at which said tube collapses.

5. A method as set forth in claim 1 said metal strip is steel and said method further comprises an optional step of galvanizing said metallic pipe prior to said step of sizing, said step of galvanizing comprising the following serial substeps:
   (a) cleaning the exterior surface of the moving pipe and drying the cleaned exterior surface;
   (b) passing the cleaned pipe through a flux bath which is at a first temperature;
   (c) heating the pipe to a second temperature which is above said first temperature and below the melting temperature of said plastic sleeve;
   (d) passing the heated pipe through a molten zinc bath which has a temperature above the melting temperature of said sleeve; and
   (e) quenching the galvanized pipe to prevent collapse of said plastic sleeve.

6. A method as set forth in claim 1 wherein the step of maintaining includes selecting the outside diameter and wall thickness of the plastic sleeve so that said plastic tube becomes tacked to said metallic pipe along the weld.

7. A method as set forth in claim 1 wherein said plastic sleeve is extruded from molten thermoplastic which optionally contains at least 20 weight % of talc.

8. A method as set forth in claim 1 wherein said thermoplastic includes polyethylene.

9. A method as set forth in claim 1 wherein said thermoplastic includes polypropylene.

10. A method as set forth in claim 1 wherein said thermoplastic includes PVC.

11. A method as set forth in claim 1 wherein said thermoplastic includes nylon.

12. A method as set forth in claim 1 wherein said thermoplastic includes Teflon.

13. A method as set forth in claim 1 wherein said thermoplastic includes Noryl.

14. A method as set forth in claim 1 wherein said thermoplastic includes Halar.

15. A method as set forth in claim 1 wherein said thermoplastic includes Kynar.

16. A method as set forth in claim 1 wherein said plastic sleeve has a wall thickness of at least 0.030 inch.

* * * * *

UNITED STATES PATENT AND TRADEMARK OFFICE
CERTIFICATE OF CORRECTION

PATENT NO. : 5,000,369
DATED : March 19, 1991
INVENTOR(S) : David A. SHOTTS et al.

It is certified that error appears in the above-identified patent and that said Letters Patent is hereby corrected as shown below:

Column 4, line 6, change "$2\frac{1}{4}$" to --$2\frac{1}{2}$--.

Column 5, lines 23-24, change "instantaneous" to --instantaneously--.

Column 6, line 60, change "$1\frac{1}{4}$" to --$1\frac{1}{2}$--.

Column 7, line 1, after "claim 1" insert --wherein--.

Signed and Sealed this

Ninth Day of November, 1993

Attest:

BRUCE LEHMAN

Attesting Officer     Commissioner of Patents and Trademarks